Feb. 23, 1926.
C. W. DAVIS ET AL
1,574,278
RETAINER FOR RADIAL BALL BEARINGS
Filed March 26, 1925
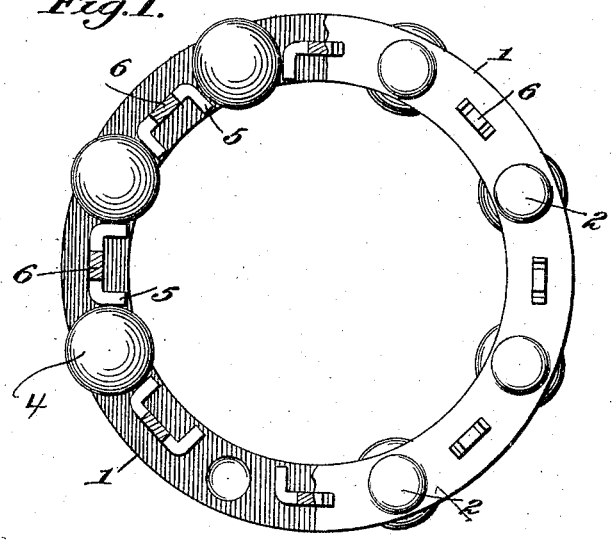
Fig.1.
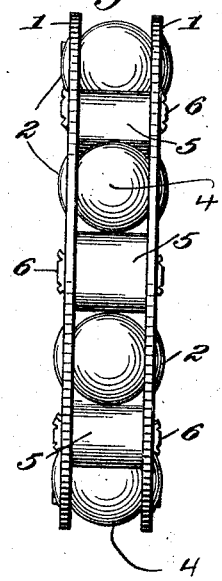
Fig.2.
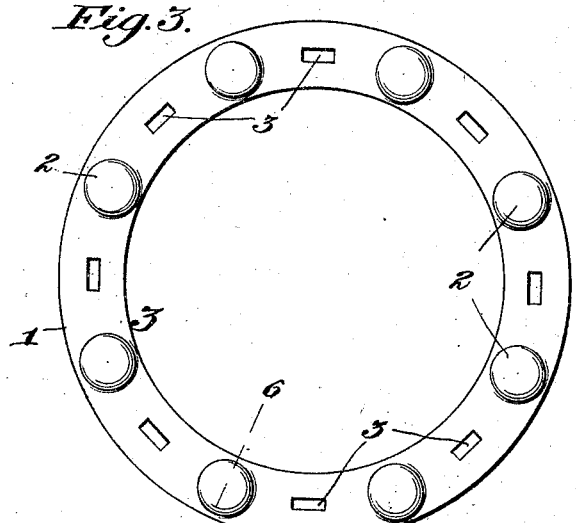
Fig.3.
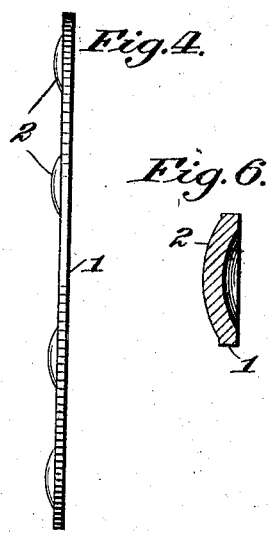
Fig.4.
Fig.6.
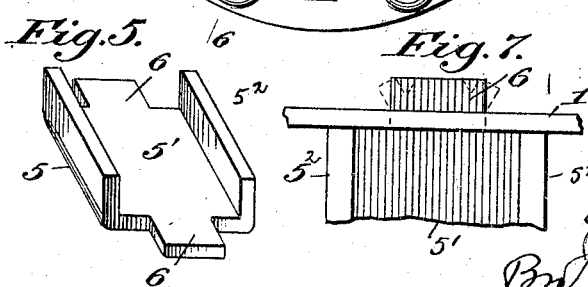
Fig.5.
Fig.7.
Inventors,
Charles W. Davis
John A. Calder
By Sturtevant & Mason
Att'ys.

Patented Feb. 23, 1926.

1,574,278

UNITED STATES PATENT OFFICE.

CHARLES W. DAVIS AND JOHN A. CALDER, OF TORRINGTON, CONNECTICUT, ASSIGNORS TO THE TORRINGTON COMPANY, OF TORRINGTON, CONNECTICUT, A CORPORATION OF CONNECTICUT.

RETAINER FOR RADIAL BALL BEARINGS.

Application filed March 26, 1925. Serial No. 18,476.

*To all whom it may concern:*

Be it known that we, CHARLES W. DAVIS and JOHN A. CALDER, citizens of the United States, residing at Torrington, in the county of Litchfield, State of Connecticut, have invented certain new and useful Improvements in Retainers for Radial Ball Bearings, of which the following is a description, reference being had to the accompanying drawing and to the figures of reference marked thereon.

The invention relates to retainers or cages for radial ball bearings.

The object of the invention is to provide a simple, inexpensive and durable retainer for radial ball bearings and one in which the two side rings will be held firmly together by a series of spacers.

This object I accomplish by the construction shown in the accompanying drawing, in which—

Figure 1 is a side elevation of one of the improved retainers; one plate or ring being broken away;

Fig. 2 is an edge view thereof;

Fig. 3 is a side view of one of the rings;

Fig. 4 is an edge view thereof;

Fig. 5 is a perspective of one of the spacers;

Fig. 6 is a section on line 6—6 of Fig. 6;

Fig. 7 is an enlarged fragmentary view showing the manner of securing the spacer tenons to one of the rings.

The retainer comprises two parallel annular side plates or rings 1—1, formed with shallow opposed ball receiving depressions or recesses 2, in their adjacent faces. These plates or rings 1, are formed from flat metal with the depressions or recesses 2, in a press by means of suitable punches. Elongated holes 3, or slots, are also pierced in the same operation, which assures an accurate spacing of both the holes and the depressions or recesses. The ⌊⌋-shaped spacers or separators 5, are blanked and formed as shown in Fig. 5, and are formed at the ends of their closed sides 5′ with the tenons 6, of a size to engage the holes or slots 3 in the plates or rings 1. The side flanges 5², are at right angles to closed side 5′, and the tenons 6 are formed on the ends of the part 5′ by cutting out the corners of the flanged sides 5². The form of spacers 5 is such that when assembled with the plates 1, a rigid support is secured between the plates and there is little or no tendency to buckling of the side wall when the staking of the tenons 6 is performed. The ends of the spacers are straight and lie flat against the inner faces of the plates or rings 1. This staking or riveting of the tenons is effected by a very light pressure with one application of a multi-tooth punch which spreads the outer ends of the tenons 6, as shown in Fig. 7, so that the metal thereof is compressed closely into the slots 3, and also overlies the outer sides of the slots, so that a rigid connection is formed. A much neater connection is also afforded as compared with bending a tenon laterally at its outer end over upon the outer face of the plates or rings.

In assembling the parts, one plate 1, has the spacers 5, staked thereto, as just described, and then the balls, 4, are placed in the depressions or recesses 2, and the other plate or ring 1, is then placed in position with the other set of tenons passing through its slot 6, and anchored by staking, as just described, see Fig. 7. There will be any desired number of balls and corresponding recesses and spacers.

Having thus described our invention, what we claim as new and desire to secure by Letters Patent, is:

A retainer for ball bearings comprising two parallel flat plates or rings provided with opposed pairs of slots, and a series of spacers each formed of a ⌊⌋-shaped piece cut away at right angles at its four corners to form tenons 6 and angular corners closely abutting the inner faces of the plates or rings, the said tenons extending through opposing pairs of slots and expanded in opposite directions at their outer ends, thereby compressing the metal thereof closely into the slots and forming a rigid connection therewith substantially flush with the outer faces of said plates or rings.

In testimony whereof, we affix our signatures.

CHARLES W. DAVIS.
JOHN A. CALDER.